March 31, 1970   P. L. ANDERSON ET AL   3,504,103
MULTILAYER ELECTRICAL CONDUCTOR ASSEMBLY
Filed June 28, 1968
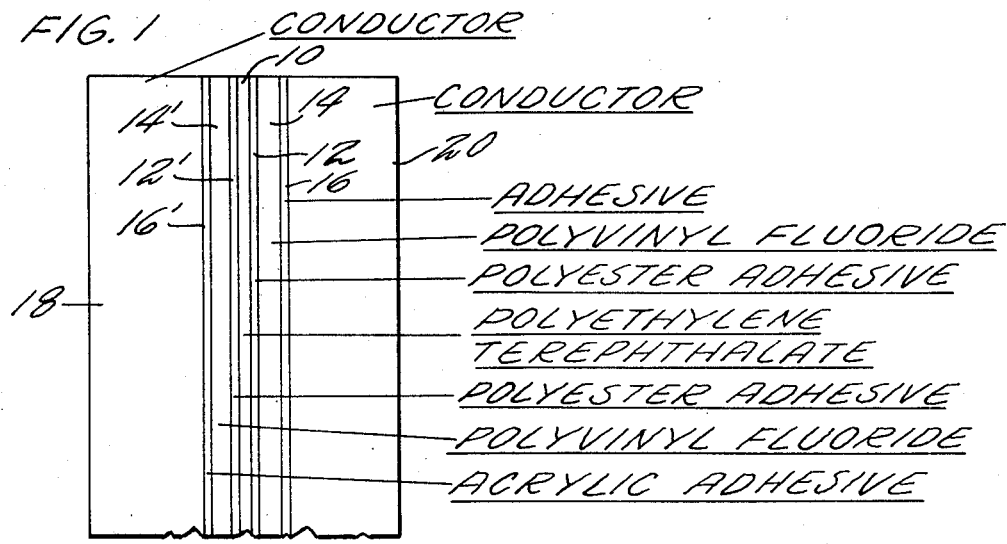
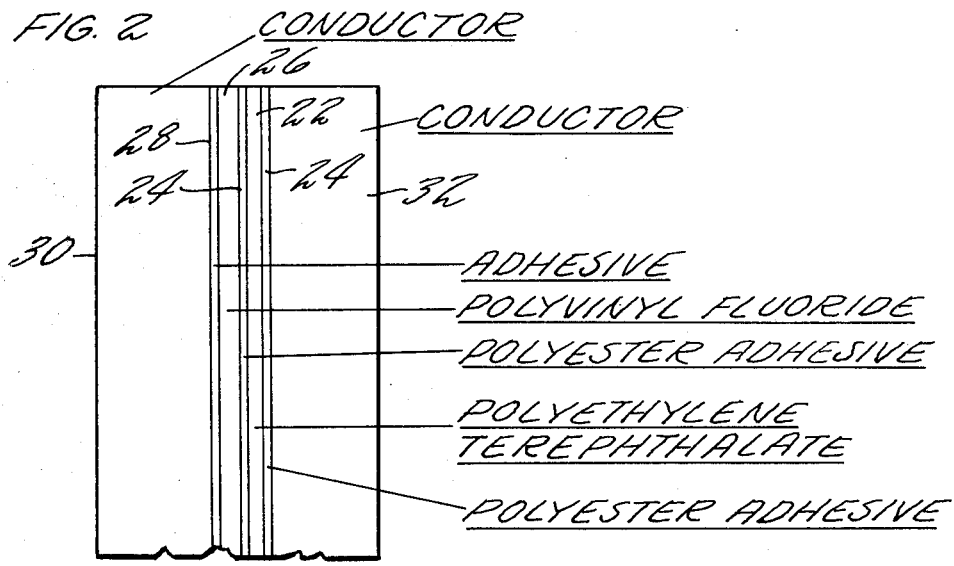
INVENTORS
PAUL L. ANDERSON
BENJAMIN J. RANDALL
MICHAEL F. IOSUE
BY Fishman & Van Kirk
ATTORNEYS

United States Patent Office 3,504,103
Patented Mar. 31, 1970

3,504,103
MULTILAYER ELECTRICAL CONDUCTOR ASSEMBLY
Paul L. Anderson, Vernon, Benjamin J. Randall, Danielson, and Michael F. Iosue, Dayville, Conn., assignors to Rogers Corporation, Rogers, Conn., a corporation of Massachusetts
Continuation-in-part of application Ser. No. 538,724, Mar. 30, 1966. This application June 28, 1968, Ser. No. 741,077
Int. Cl. C09j 7/00; H01b 7/08
U.S. Cl. 174—117                               8 Claims

ABSTRACT OF THE DISCLOSURE

A laminated insulator comprised of at least two plastic films, one of such films having a dielectric constant in excess of six and another of said films having a dielectric strength in excess of 1000 volts per mil and having high hot "burst-through" resistance and resistance to penetration. The plastic film having the high dielectric constant may, for example, be polyvinyl fluoride while the material having the high dielectric strength may be polyethylene terephthalate.

CROSS-REFERENCE TO RELATED APPLICATIONS

The present application is a continuation-in-part of application Ser. No. 538,724, filed Mar. 30, 1966 and entitled "Laminated Bus Bar Assembly" now abandoned.

BACKGROUND OF THE INVENTION

Field of the invention

The present invention is directed to multilayer electrical conductor assemblies having a low characteristic impedance, high dimensional stability, high resistance to puncture and high dielectric strength. More particularly, the present invention relates to a laminated bus bar assembly. Accordingly, the general objects of the present invention are to provide novel and improved apparatus of such character.

Description of the prior art

While not limited thereto in its utility, the present invention has been found to be particularly suitable for use in high-speed digital computers. In recent years, the trend in computer design has been towards providing extremely high speed operation. These speeds, in the nanosecond range, have created a problem for the computer designed in that high speeds and low power dissipation demand low signal level operation where the amount of "noise" generated by the wiring and components is the limiting factor. In a power distribution system, electrical "noise" is a function of the "characteristic impedance" of the conductor or bus bar assembly and, therefore, this impedance must be kept as low as possible.

In order to achieve the lowest obtainable characteristic impedance, not only should the inductance of a multilayer electrical conductor assembly be as small as possible, but the capacitance between adjacent conductors should be as large as practical. For maximum capacitance, the dielectric constant of the insulating material should be as high as possible and the insulation should be as thin as practical. In addition to the calculated impedance, the bus bar or conductor assembly must have a dielectric strength between layers of at least 500 volts per mil and usually in excess of 1000 volts per mil. As is well known, the dielectric strength is the limiting factor to the use of thinner insulating materials. In the case of prior art insulation systems, the requirements for low characteristic impedance and high dielectric strength have been considered to be mutually exclusive. That is, as insulation thickness was sreduced to maximize capacitance, the chances of sparking between adjacent conductors increased. This is attributable to the fact that the available insulation materials having high dielectric constants are inclined to have pin holes therein. Conversely, plastic insulation films which lack discontinuities and have high dielectric strength have inherently had a low dielectric constant.

An additional requirement imposed upon multilayer electrical conductor assemblies are high mechanical strength, particularly with regard to resistance to penetration by metal burrs on the conductors or by dirt particles that become trapped on insulator or conductor surfaces during the laminating or molding process. Further, such assemblies should have high dimensional stability and thus be subject to minimal size variation over a wide range of temperatures.

SUMMARY OF THE INVENTION

The present invention contemplates a novel and improved multilayer electrical conductor assembly which embodies a novel and improved laminated insulation, the resulting assembly having low characteristic impedance. The invention consists in providing an insulation system comprising a plurality of thin plastic insulating sheets, at least one of the sheets having a high dielectric constant and at least another of the sheets being characterized by good mechanical strength and resistance to penetration and also by high dielectric strength. The sheets are bonded together with a suitable adhesive to provide a laminate and may thereafter be bonded between conductors.

In one form of the present invention, to achieve the best characteristic impedance for a bus bar assembly, plastic films of polyvinyl fluoride are adhesively bonded to both sides of a film of polyethylene terephthalate to form an insulation laminate, the polyethylene terephthalate forming an interliner. The laminate is then adhesively securely bonded between conductors. The conductors may be of any known bus bar construction depending upon the intended use of the assembly.

Accordingly, the invention has for a principal object to provide a novel and improved highly efficient light-weight bus bar which is characterized by possessing low characteristic impedance.

A further object of the invention is to provide a novel and improved insulation for use in multilayer electric conductor assemblies, the insulation of the present invention being characterized by having a high dielectric constant, high dielectric strength and good mechanical strength.

BRIEF DESCRIPTION OF THE DRAWING

With the foregoing general objects in view and such others as may hereinafter appear, the present invention consists in a multilayer electrical conductor assembly and novel insulation hereinafter described and particularly defined in the claims at the end of this specification. The conductor assembly and insulation may be more easily understood by reference to the accompanying drawings wherein:

FIGURE 1 is an end view of the preferred form of the present invention; and

FIGURE 2 is an end view of another form of the invention.

DESCRIPTION OF THE PREFERRED EMBODIMENTS

In accordance with the present invention, it has been found that the attributes of an insulation which is as thin as practical, has a high dielectric constant, adequate dielectric strength, good mechanical strength, good hot "burst-through" resistance, high resistance to penetration and good dimensional stability may be achieved by means of an insulation system comprising a laminate of plastic films. One of these films must have a high dielectric constant, that is a dielectric constant of at least six, while another plastic film comprising the laminate must have the requisite mechanical and physical properties in addition to having a dielectric strength of at least 1000 volts per mil. While not limited to these particular materials, it has been found that a combination (laminate) of films of polyvinyl fluoride and polyethylene terephthalate provides an insulation which is as thin as practical, has a high dielectric constant, adequate dielectric strength and good mechanical and thermal properties. The polyvinyl fluoride sheets possess a high dielectric constant, in the neighborhood of ten prior to lamination with other materials. A film of polyethylene terephthalate, while having a low dielectric constant (in the neighborhood of three), possesses a dielectric strength in excess of 1000 volts per mil in addition to having the properties of toughness, good mechanical strength and good resistance to penetration.

It has been found that conductors separated by a laminate of the above-described insulating films provide an ideal low characteristic impedance bus bar for use in computers designed for high speed operation.

In other forms of the present invention, a duplex laminate may be formed by adhesively bonding a polyvinyl fluoride sheet to one side of a sheet of polyethylene terephthalate. The laminate is coated on its outer surfaces with an adhesive and is bonded between copper conductors.

Referring now to the drawings and particularly to FIGURE 1, 10 is a film of polyethylene terephthalate, one-half mil in thickness, coated on its opposite surfaces with an adhesive 12–12' of the polyester type which may be purchased on the market under the name "Du Pont No. 46971." A film of polyvinyl fluoride 14, one mil in thickness, is adhesively tacked to one side of the polyethylene terephthalate sheet 10 by means of adhesive 12, and a second polyvinyl fluoride sheet 14', also one mil in thickness, is bonded to the other surface of the polyethylene terephthalate sheet by means of adhesive 12'. Thus, a tri-plex laminate is produced. The exposed surfaces of the polyvinyl fluoride films 14 and 14' are thereafter coated with an adhesive 16–16' and the laminate is then placed between conductors 18 and 20 and adhesively bonded thereto. Conductors 18 and 20 may, for example, be comprised of tin coated copper. The adhesive 16–16' may, again for purposes of example only, be an acrylic type of adhesive such as "Du Pont No. 6840."

In a modified form of the invention illustrated in FIGURE 2, a sheet of polyethylene terephthalate 22 is coated on both sides with a polyester type adhesive 24, "Du Pont No. 46971," and a sheet of polyvinyl fluoride 26 is adhesively bonded thereto. The plastic sheets are thereafter adhesively bonded between copper conductors 30 and 32 using suitable adhesives. It should be noted that in most instances where a single film of polyvinyl fluoride is employed, the insulation system would be employed primarily for protective purposes and thus, considering FIGURE 2, conductor 32 would be omitted.

The thickness of the polyvinyl fluoride sheet or sheets may, of course, be varied according to the electrical requirements of the multilayer electrical conductor assembly and the thickness of the polyethylene terephthalate sheet may vary according to the mechanical strength and dielectric strength requirements of the particular use of the assembly.

While for purposes of illustration, not by way of limitation, the thickness of the polyvinyl fluoride sheets have been described as being one mil in thickness and the polyethylene terephthalate one-half mil in thickness, it will be understood that the thickness of each may vary according to the electrical and mechanical requirements of the bus bar assembly.

It will be apparent from the foregoing description that the present invention provides a novel and improved insulation structure and multilayer conductor assembly having highly efficient and desirable electrical and mechanical properties.

Having thus described the invention, what is claimed is:

1. A bus bar assembly comprising electrical conductors and a plurality of insulating sheets, said insulating sheets comprising sheets of polyvinyl fluoride bonded on both sides of a sheet of polyethylene terephthalate to form a laminated insulation sheet having a high dielectric constant and high mechanical and dielectrical strength and toughness, said laminate being bonded between the conductors to provide a bus bar having low impedance characteristics.

2. A bus bar assembly of the character described in claim 1 wherein the sheets of polyvinyl fluoride are one mil in thickness and the polyethylene terephthalate sheet is one-half mil in thickness.

3. A bus bar assembly comprising electrical conductors and insulation for said conductors, said insulation comprising at least a first sheet of polyvinyl fluoride coated on at least one side with an adhesive, and a sheet of polyethylene terephthalate coated on both sides with an adhesive, said adhesive coated sheets being bonded together and between said electrical conductors.

4. The apparatus of claim 3 wherein the adhesive coated on the polyethylene terephthalate sheet comprises:
   a polyester adhesive.

5. The apparatus of claim 4 wherein the adhesive coated on at least one side of the polyvinyl fluoride sheet comprises:
   an acrylic adhesive.

6. A multilayer electrical conductor assembly comprising a pair of electrical conductors and insulation separating said conductors, said insulation comprising a plurality of thin plastic sheets, at least one of said sheets having a dielectric contant of at least 6, and another of said sheets having a lower dielectric constant than said one of said sheets and having greater resistance to penetration than said one of said sheets, said another of said sheets also having a dielectric strength higher than said one sheet and at least 1000 volts per mil, said sheets being bonded together to form a laminate.

7. A multilayer electrical conductor assembly having a low characteristic impedance and having high dimensional stability, high resistance to puncture and high dielectric strength, said assembly comprising:
   a pair of electrical conductors, and
   an insulation system disposed between and bonded to said conductors, said insulation system comprising a firt layer of inulating material having a dielectric constant not greater than 3 and a dielectric strength of at least 1000 volts per mil, said first layer of insulating material being sandwiched between at least two layers of insulating material each having a dielectric constant of at least six.

8. The apparatus of claim 7 wherein said layers of insulating material are adhesively bonded to one another and said insulation system is adhesively bonded to said conductors.

References Cited

UNITED STATES PATENTS

| | | | |
|---|---|---|---|
| 3,057,952 | 10/1962 | Gordon | 161—189 X |
| 3,136,680 | 6/1964 | Hochberg | 161—189 |
| 3,160,703 | 12/1964 | Muller | 174—120 |
| 3,168,617 | 2/1965 | Richter | 174—117 |
| 3,257,266 | 6/1966 | Sapper | 161—188 |
| 3,257,500 | 6/1966 | Rusch et al. | 174—117 X |
| 3,276,946 | 10/1966 | Cole et al. | 161—189 |

OTHER REFERENCES

Wire—May 1966—"The Evaluation of Kynar-Vinylidene Fluoride as an Insulator for Computer Applications," by Duckert, Pennsalt Chemical Corp., Phila., Pa., pp. 738–740, 790–1.

HAROLD ANSHER, Primary Examiner

U.S. Cl. X.R.

161—189, 231; 174—120